May 26, 1964  B. M. AAGAARD  3,134,516
FEEDING MEANS

Filed Nov. 15, 1960  4 Sheets-Sheet 1

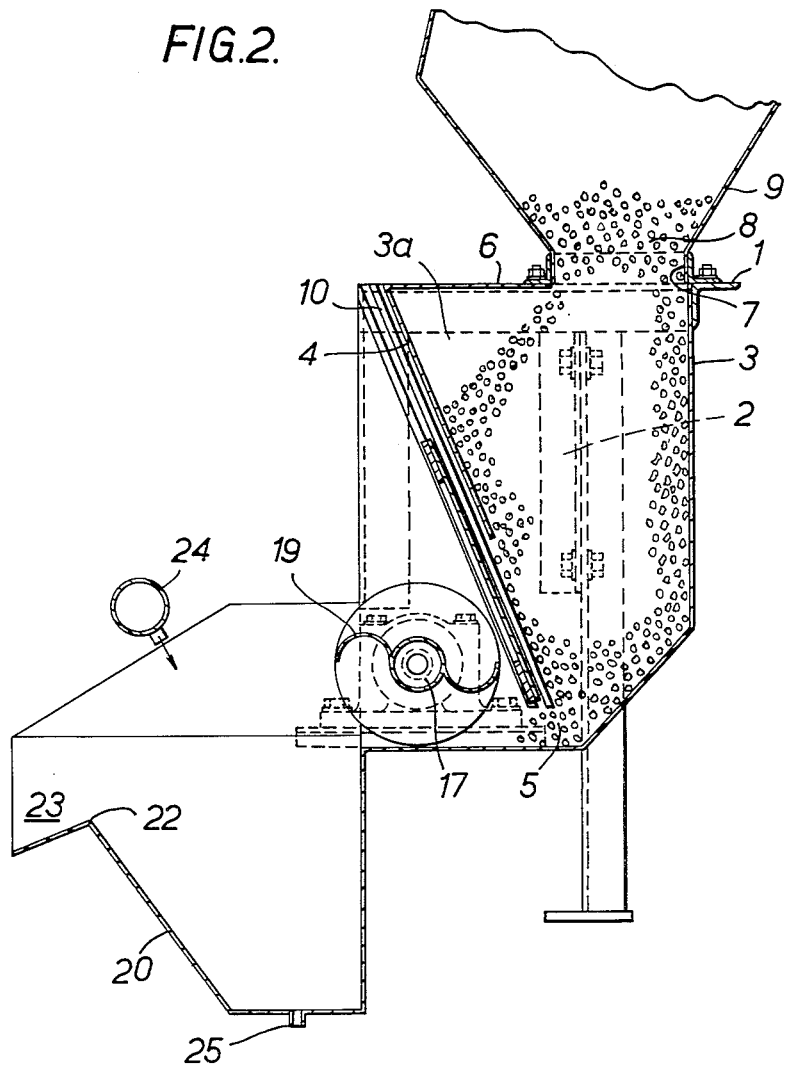

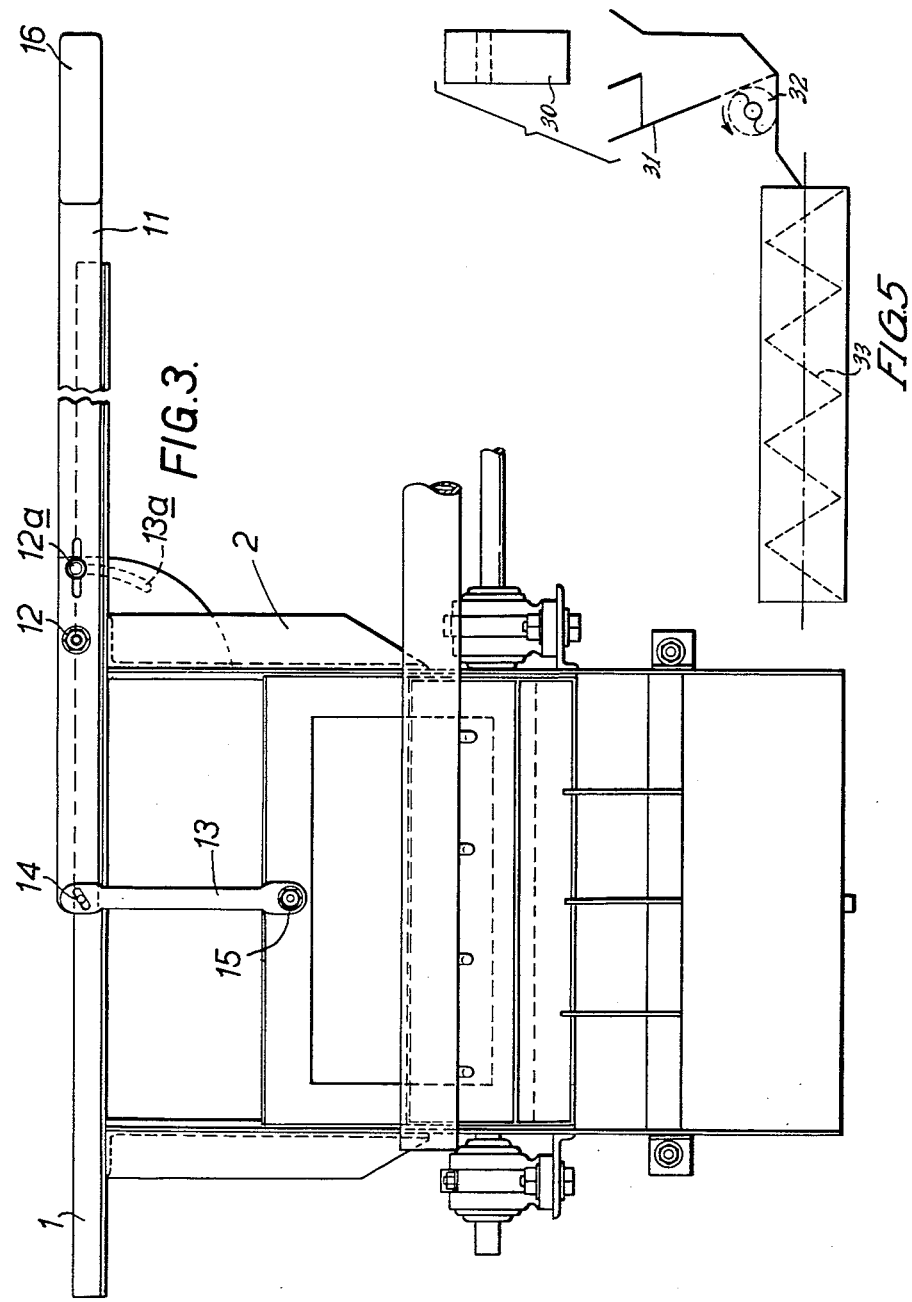

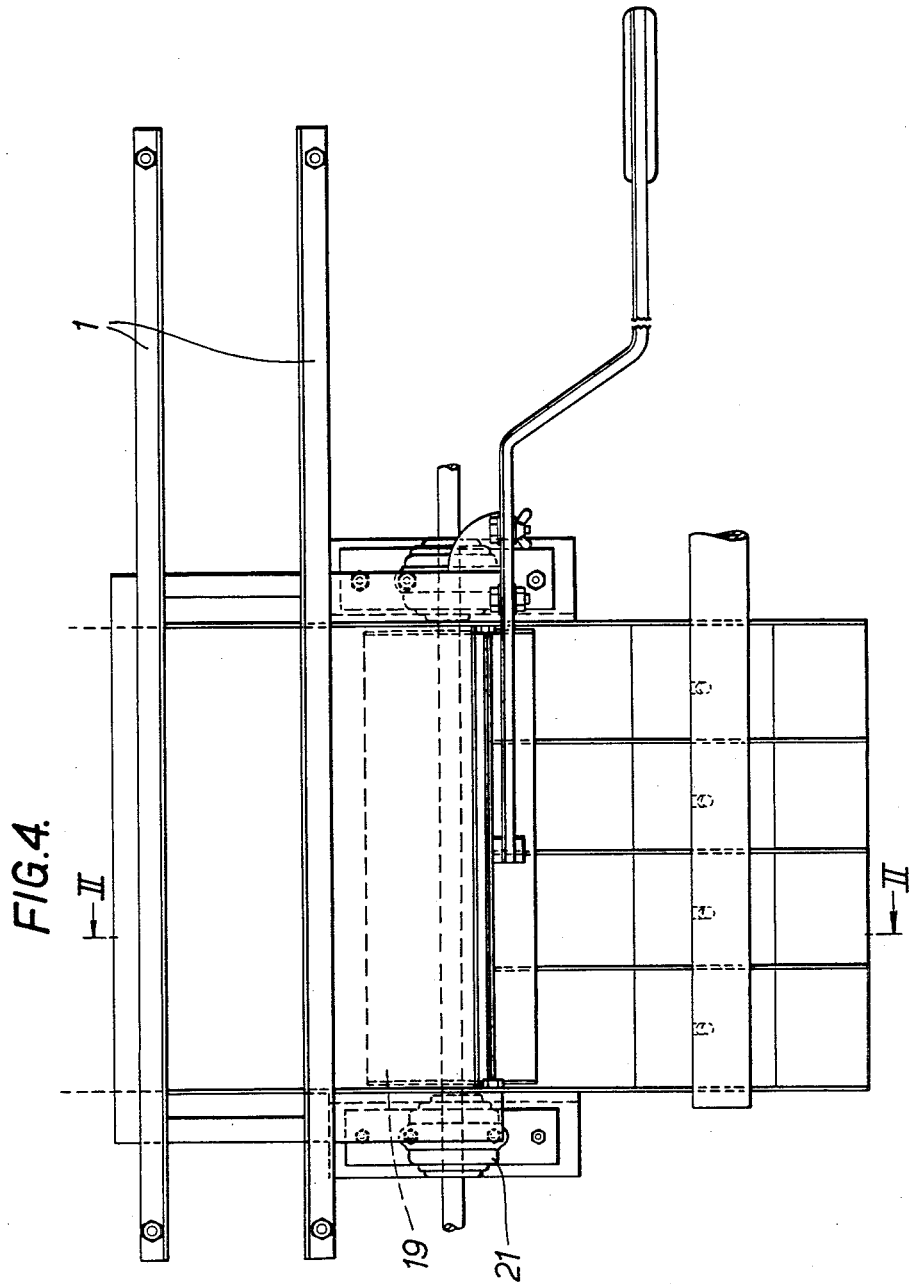

United States Patent Office 3,134,516
Patented May 26, 1964

3,134,516
FEEDING MEANS
Bernhard M. Aagaard, P.O. Box 17, Kiambu, Kenya
Filed Nov. 15, 1960, Ser. No. 69,507
Claims priority, application Great Britain Nov. 19, 1959
2 Claims. (Cl. 222—317)

The invention relates to apparatus for feeding articles, substances or bulk material to determined positions and has particular application to the feeding of coffee cherries to the pulping discs of pulping plant. With appropriate modification of construction the invention may also be applied to plant for mixing concrete in which sand, cement and ballast in determined proportions are fed to a mixing plant.

As the apparatus according to the invention is particularly suitable for use in the preparation of coffee for the market, its application in respect to such a process will be described to illustrate the invention but it will be understood that the invention is not limited to such a process.

The preparation of coffee for the market comprises the following main steps:

(1) Pulping, which involves removal of the skin and fleshy part of the coffee cherries which surrounds the bean or beans, which comprise the seed or stone of the fruit.
(2) Further skin removal and pre-grading.
(3) Fermentation.
(4) Washing, removal of fermented mucilage.
(5) Grading of the beans in a washing channel.
(6) Drying by sun or machinery.

The invention relates to the preliminary step of passing the cherries to the pulping plant.

One of the difficulties of known methods of feeding to the pulpers is to ensure that equal amounts are passed to each pulper disc and it is a disadvantage that known methods require one man to watch the feeding to ensure an even feed and to remove obstructions.

It is among the objects of the invention to avoid this disadvantage and to provide apparatus which will provide a uniform supply without the necessity for continuous supervision.

According to the invention, as applied to the preparation of coffee, the coffee cherries are fed from a source of supply such as a main hopper to the hopper of the feeding apparatus mounted immediately beneath the outlet from the main hopper, and pass under gravity to the outlet of the hopper of the feed apparatus, which outlet is controlled by a slide, to deposit the cherries in a heap at a position immediately in front of the outlet whence they are removed by rotary or star feed means in measured quantity to the pulping plant.

The slide is advantageously provided in a wall of the hopper for the feeding apparatus, advantageously in the front wall, the lower edge of the slide controlling the size of the outlet, and the slide being controlled through a pivoted hand-operated lever from a position externally of the hopper.

According to the invention furthermore, means are provided associated with the feeding apparatus hopper to prevent jamming of the cherries in their passage through the hoppers. Such means may consist in forming the feeding apparatus hopper as to present a free lateral space immediately below the level of the inlet to said hopper from the main hopper.

In application of the invention to the preparation of concrete the control means operate to determine the quantities of ballast, sand and cement passed to the rotary means to be fed by the rotary means to the mixing plant.

The invention further comprises the features of construction hereinafter described.

The invention is diagrammatically illustrated by way of example in the accompanying drawings, in which FIGURE 1 is a side elevation of a machine constructed according to the invention;

FIGURE 2 is a sectional elevation on the line A—A of FIGURE 1;

FIGURE 3 is a front elevation;

FIGURE 4 is a corresponding plan; and

FIGURE 5 is a schematic diagram of the lay-out of apparatus for application to the preparation of concrete.

Figure 1:
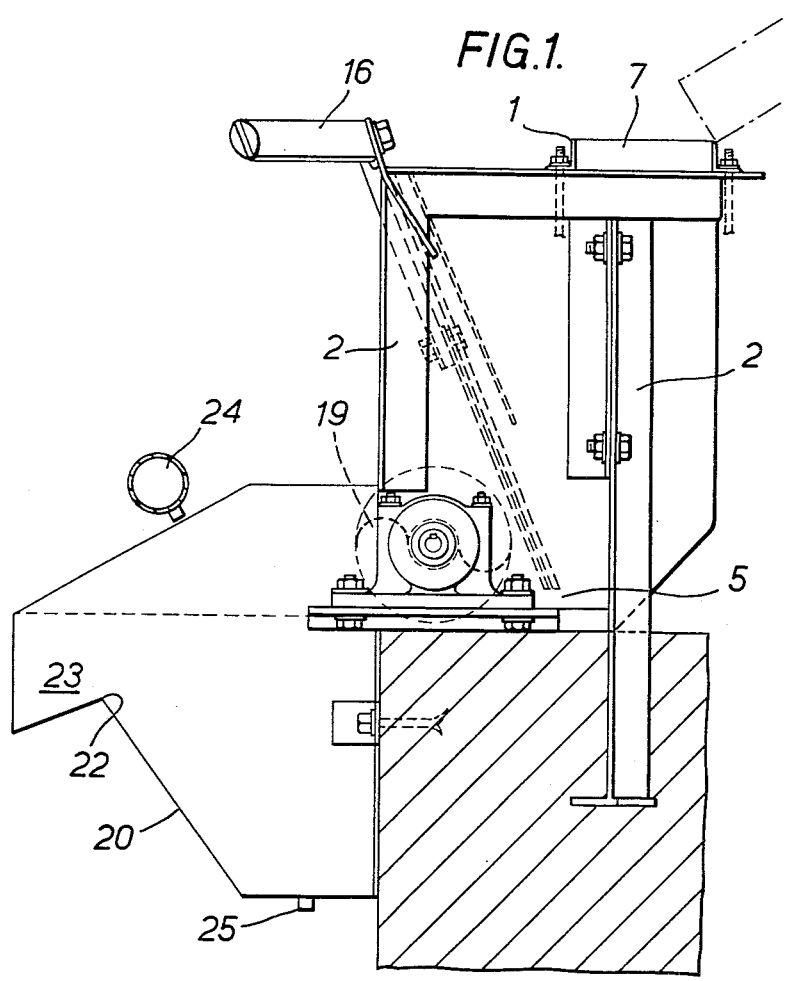

In the construction illustrated in FIGURES 1 to 4 of the accompanying drawings of a machine for feeding coffee cherries to a pulping machine, the feeding machine consists of a steel framework made up of a pair of parallel horizontally extending steel girders 1 to which are secured vertical steel stanchions 2 for the support of a hopper 3, the stanchions 2 being anchored for example in concrete foundation. The hopper 3 is formed with four sides and to a generally tapering section from the top downwardly with the front wall 4 inwardly inclined to present at the bottom a lateral outlet 5. At a rear position on this flat top 6 of the hopper 3 is bolted an inlet fitting 7 of a corresponding dimension to that of an outlet 8 provided at the lower end of a main hopper 9 of generally tapering form.

The front inclined wall 4 of the hopper 3 is formed as a movable door or slide mounted in lateral guides 10 and operable by means of a rod 11 pivoted at 12 on the frame members 2 to raise or lower a link 13 pivotally connected at one end to one end 14 of the rod and at the other end 15 pivotally connected to the upper edge of the door or slide 4. The other end 16 of the rod 11 is formed as a handle, which, when raised or lowered, respectively lowers or raises the door or slide 4 to decrease or to increase the dimensions of the outlet 5. Locking means for retaining the rod 7 in any adjusted position of the door or slide 4 consist of a wing bolt 12a slidable in a slot 13a.

Immediately in front of the outlet 5 at the bottom of the hopper 3 is mounted a feed mechanism consisting of a horizontally disposed roller 17 mounted in bearings 21 and extending the lateral width of the outlet 5 and having mounted to extend laterally and radially at diametrically opposite positions on the shaft 18 scoop members 19 of cup shaped transverse section. The feed mechanism is advantageously operated by an electric motor.

In front of and at a level below the feed mechanism to extend laterally in a direction forwardly of the hopper 5 is a container 20 which serves as a stone (impurities) trap being formed at the forward end with a weir 22. An outlet 23 enables the coffee cherries to float in a stream of water supplied from a pipe 24 over the weir 22 in to the pulping machine, not shown.

The stones (impurities) fall under gravity into the container or trap 20 are periodically removed through a draining outlet closed by a plug 25 from the bottom of the container 20.

In operation the coffee cherries fall under gravity from the main hopper 9, which may contain several tons of cherries through the outlet 8 into the feed hopper 3 through the inlet 7 at the upper end.

As indicated clearly in FIGURE 2 of the drawings a space 3a is left below the top of the hopper 3 at the forward end, which space will operate to prevent any jamming of the cherries in their passage through the hoppers.

The door or slide 4 is set to leave a determined opening at the outlet 5 so that a heap of cherries will form continuously at a position on the base of the hopper, immediately in front of the outlet 5 whence they are removed by the rotating feeding mechanism to be deposited in the container or stone trap 20.

FIGURE 5 shows a lay-out for the feed of sand, cement, and ballast in the desired quantities to form concrete from a hopper 30 to a feed hopper 31 according to the invention, whence the constituent materials are passed by feed mechanism 32 of the kind hereinbefore described in to one end of a mixer spiral 33 in which they are mixed with water.

What I claim is:

1. In an apparatus for conveying materials of the same or different character from a source of supply to a treating station, the combination: a first hopper having walls, including a lowermost fixed inclined wall; one of said walls being inclined to the horizontal and movable with respect to the other of said walls for forming an outlet in the lower end of said first hopper; means for moving said movable wall to vary the dimensions of said outlet; a horizontal platform below said variable outlet integral with said fixed wall and serving to collect a substantially stationary pile of said materials; rotary feed means having curved scoops adjacent said outlet and operating against the direction of movement of said materials in said hopper for transferring uniform quantities of said pile of materials from said platform; and a second hopper adjacent the outlet side of said feed means for receiving the material discharged from said feed means, in discharge position a portion of each scoop extending over the second hopper, said second hopper including means for directing a fluid stream into said second hopper.

2. In an apparatus of the character described in claim 1, in which said first hopper is provided with guides along which said movable wall may be moved, and in which said means for moving said movable wall includes a link and a rod pivotally connected thereto.

References Cited in the file of this patent

UNITED STATES PATENTS

| | | |
|---|---|---|
| 978,320 | McDonald | Dec. 13, 1910 |
| 1,437,863 | Raymond | Dec. 5, 1922 |
| 2,286,554 | Lieberman | June 16, 1942 |
| 2,479,141 | Smith | Aug. 16, 1949 |
| 2,590,756 | Colin et al. | Mar. 25, 1952 |